(12) United States Patent
Tiesler et al.

(10) Patent No.: US 6,824,185 B2
(45) Date of Patent: Nov. 30, 2004

(54) MODULAR OVERHEAD CONSOLE ASSEMBLY

(75) Inventors: John M. Tiesler, Harrison Township, MI (US); Pawel W. Sleboda, Bloomfield Hills, MI (US); James R. Mestemaker, Lambertville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/376,861

(22) Filed: Feb. 28, 2003

(65) Prior Publication Data

US 2004/0169390 A1 Sep. 2, 2004

(51) Int. Cl.[7] .................................................. B60J 7/00
(52) U.S. Cl. ...................................... 296/37.8; 296/214
(58) Field of Search .............................. 296/214, 37.7, 296/37.8; 224/311

(56) References Cited

U.S. PATENT DOCUMENTS

| | | |
|---|---|---|
| 3,917,207 A | 11/1975 | Quigley |
| 4,738,481 A | 4/1988 | Watjer et al. |
| 4,783,110 A | 11/1988 | Beukema et al. |
| 4,844,533 A | 7/1989 | Dowd et al. |
| 4,867,498 A | 9/1989 | Delphia et al. |
| 5,020,845 A | 6/1991 | Falcoff et al. |
| 5,040,990 A | 8/1991 | Suman et al. |
| 5,050,922 A | 9/1991 | Falcoff |
| D320,587 S | 10/1991 | Kapp et al. |
| 5,154,617 A | 10/1992 | Suman et al. |
| 5,186,517 A | 2/1993 | Gilmore et al. |
| 5,303,970 A | 4/1994 | Young et al. |
| 5,522,638 A | 6/1996 | Falcoff et al. |
| 5,667,896 A | 9/1997 | Carter et al. |
| 5,775,762 A | 7/1998 | Vitito |
| 5,887,939 A | 3/1999 | Yamaguchi et al. |
| 5,927,784 A | 7/1999 | Vitito |
| 6,003,925 A | 12/1999 | Litke et al. |
| 6,019,411 A | 2/2000 | Carter et al. |

(List continued on next page.)

FOREIGN PATENT DOCUMENTS

| | | |
|---|---|---|
| DE | 198 22 638 C2 | 6/2000 |
| FR | 2779398 | 12/1999 |
| GB | 2380983 | 4/2003 |
| JP | 2003-237477 | 8/2003 |

OTHER PUBLICATIONS

Abstract Corresponding to DE 198 22 638 C2.
Patent Abstracts of Japan, 11192892 A.
Patent Abstracts of Japan, 03114926 A.
Patent Abstracts of Japan, 10278591 A.
esp@cenet—Document Bibliography and Abstract, JP 2001030841.
esp@cenet—Document Bibliography and Abstract, JP 2001130327.
Great Britain Search Report dated Apr. 22, 2004 (4 sheets).

*Primary Examiner*—Joseph D. Pape
(74) *Attorney, Agent, or Firm*—Bill C. Panagos

(57) ABSTRACT

A modular overhead console assembly and headliner combination for a passenger compartment of a vehicle includes a headliner having an upper surface, a lower surface and an elongated slot formed therethrough. An overhead console mounting arrangement is attachable to the headliner adjacent the elongated slot. The mounting arrangement includes an upper member mountable to the headliner such that the upper member extends above the upper surface of the headliner and a lower member attachable to the upper member such that the lower member extends below the lower surface of the headliner. A channel in the lower member receives and secures at least one removable accessory module. At least one electrically conductive strip is disposed adjacent the channel in the lower member to provide power to the module via electrical connectors on the module housing.

20 Claims, 6 Drawing Sheets

U.S. PATENT DOCUMENTS

| | | |
|---|---|---|
| 6,065,793 A | 5/2000 | Koshida et al. |
| 6,092,916 A | 7/2000 | Davis, Jr. et al. |
| 6,116,675 A | 9/2000 | Iwasawa |
| 6,126,221 A | 10/2000 | Kern |
| 6,176,536 B1 | 1/2001 | Miller et al. |
| 6,267,428 B1 | 7/2001 | Baldas et al. |
| 6,338,517 B1 | 1/2002 | Canni et al. |
| 6,364,390 B1 | 4/2002 | Finneman |
| 6,575,528 B2 * | 6/2003 | Tiesler et al. ............... 296/214 |
| 6,669,260 B2 | 12/2003 | Clark et al. |
| 2001/0005083 A1 | 6/2001 | Serizawa et al. |
| 2002/0163219 A1 * | 11/2002 | Clark et al. |
| 2003/0168875 A1 * | 9/2003 | Anderson et al. |

\* cited by examiner

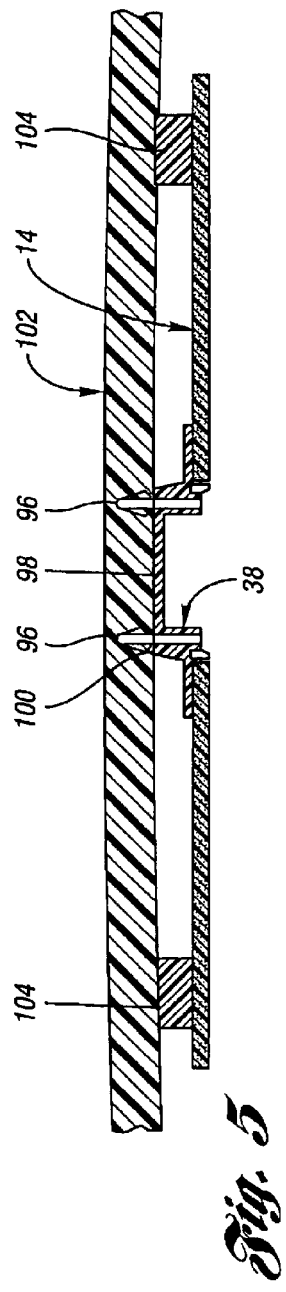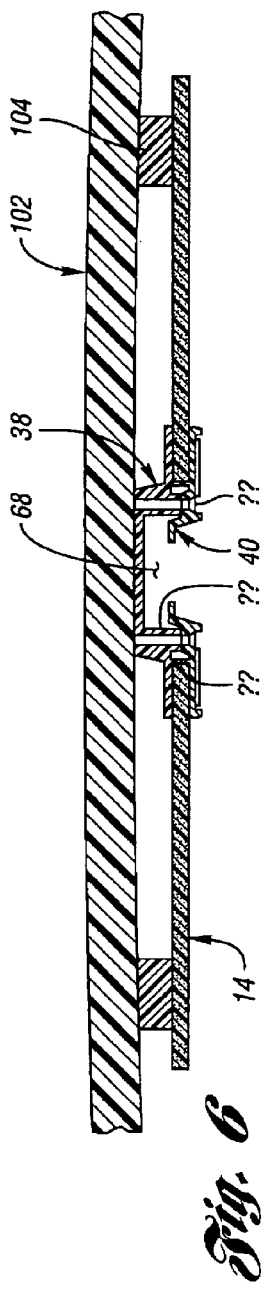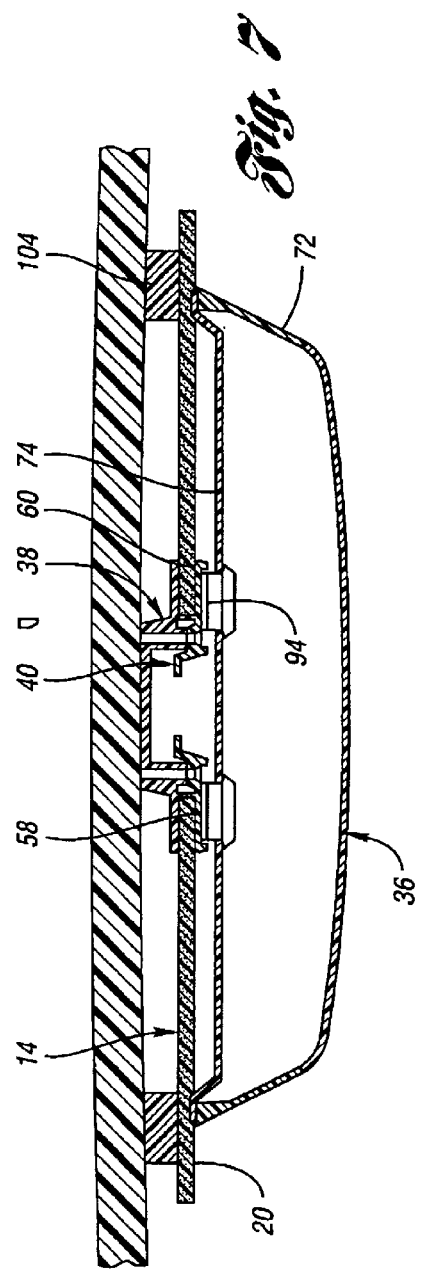

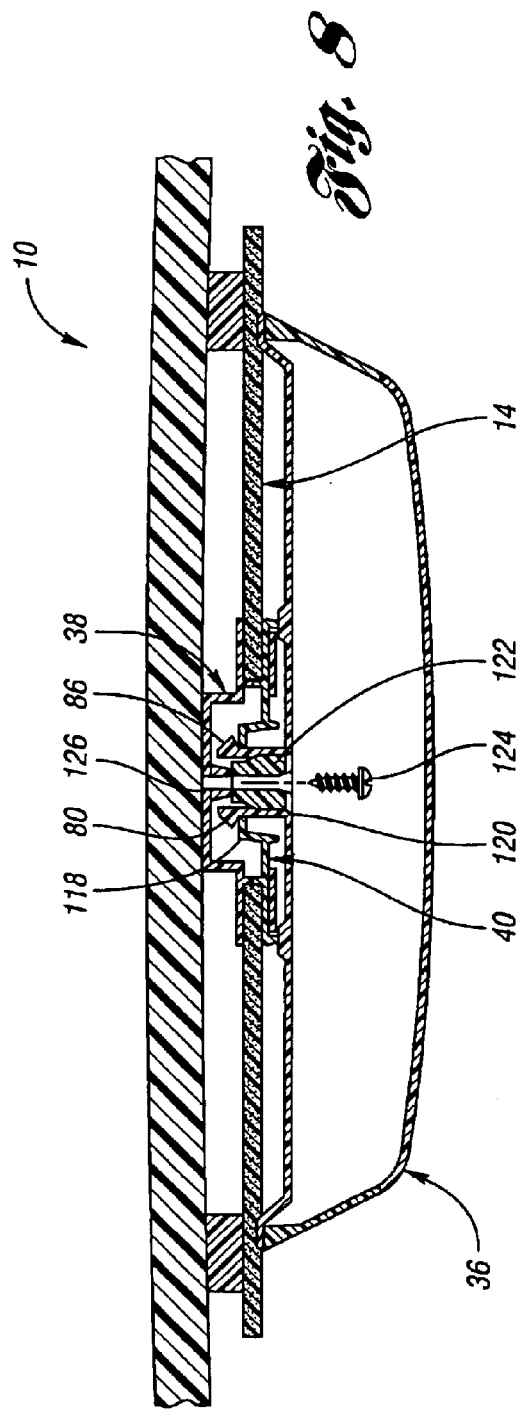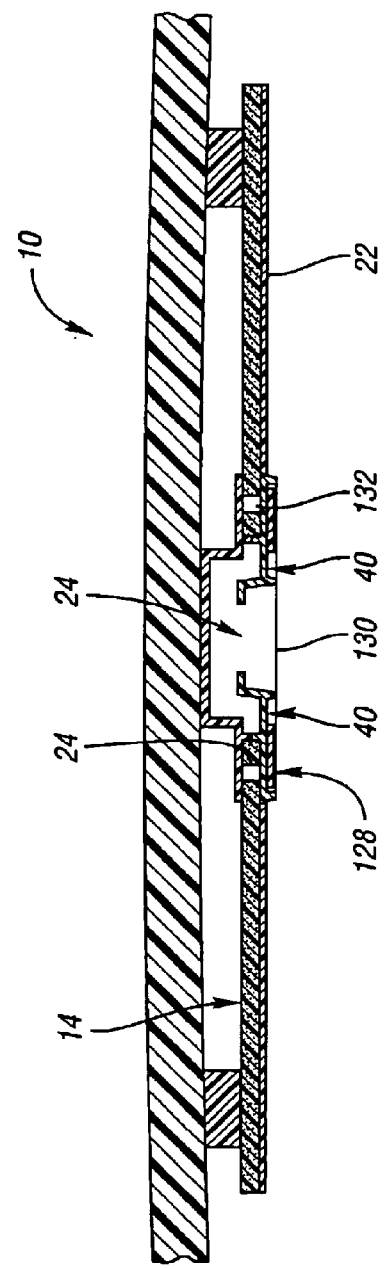

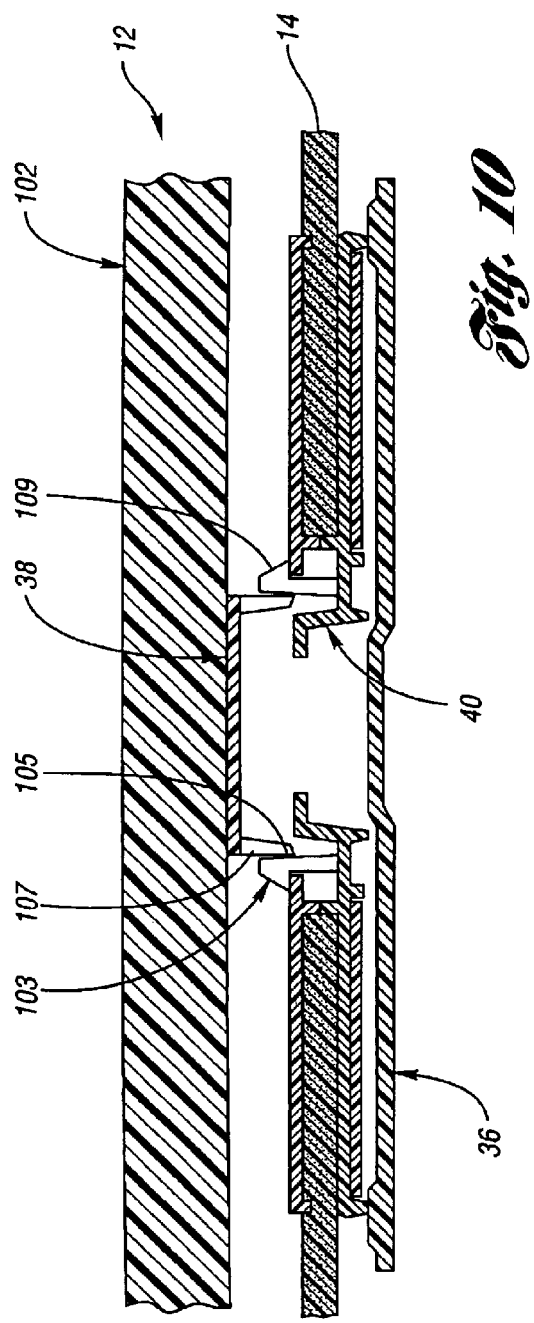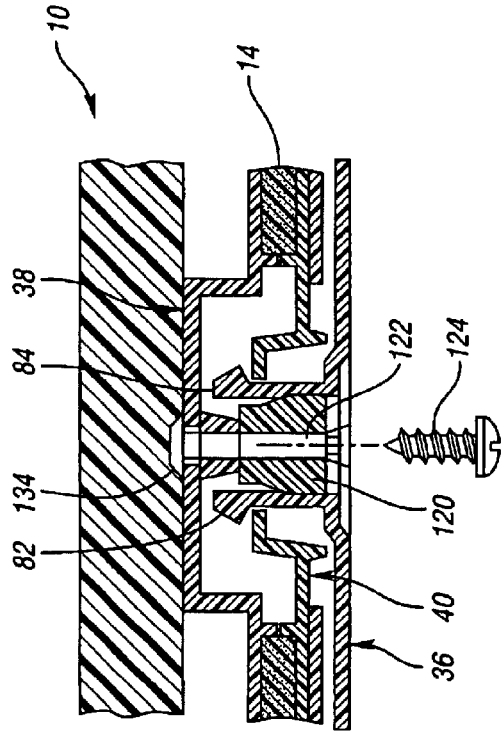

MODULAR OVERHEAD CONSOLE ASSEMBLY

BACKGROUND OF THE INVENTION

1. Field of the Invention

The present invention relates to a modular overhead console assembly having an electrical connector arrangement for use in the passenger compartment of a vehicle.

2. Background Art

Overhead consoles are commonly provided in the passenger compartment of a vehicle such as an automobile, boat or airplane. Overhead console assemblies are generally elongate structures disposed along the longitudinal axis of a headliner. The headliner includes an upper surface mounted to the interior roof structure of the vehicle and a lower surface having an overlay applied thereon. The overhead console is mounted to the lower surface of the headliner to provide additional storage space for items such as sunglasses, garage door openers and compact discs.

Current overhead console assemblies include a series of accessory compartments for storing items. The accessory compartments are pivotally mounted to the console to allow the passenger to stow and retrieve personal items from the compartment. One significant limitation of current overhead console assemblies is that the accessory compartments cannot be repositioned without a complete rebuild of the console. Fixed accessory compartments restrict repositioning of the compartments based on passenger preference. Another limitation is that stored items must be removed from the accessory compartments to transport the items between the vehicle and another location. It would be advantageous to provide an overhead console assembly for a vehicle having modular accessory compartments easily positionable on the headliner of the vehicle.

Overhead consoles assemblies frequently include electrical components, such as overhead lighting fixtures, vehicle controls for the radio and air conditioning systems, electronic components, such as compasses and temperature displays and video monitors. These electrical components must be preinstalled in the console prior to assembling the console to the headliner. If electrical components malfunction, the entire overhead console must be removed to repair the component. Further, the position of each electrical component cannot be varied to passenger requirements. It would be advantageous to provide an overhead console assembly having electrical connections to supply power to a variety of modular electrical components.

SUMMARY OF THE INVENTION

The present invention overcomes the above-referenced problems associated with prior overhead console assemblies by providing a modular overhead console assembly for the passenger compartment of a vehicle. The modular overhead console assembly includes a headliner having an upper surface attachable to a vehicle roof, a lower surface facing the passenger compartment and an elongated slot is formed therethrough.

An overhead console mounting arrangement is mounted to the headliner adjacent the elongated slot to receive at least one accessory module. The overhead console mounting arrangement includes an upper member or rail mountable to the headliner adjacent the elongated slot such a portion of the upper member extends above the lower surface of the headliner. A lower member or rail is attachable to the upper member such that the lower member extends below the lower surface of the headliner. The lower member includes a channel extending adjacent to the elongated slot. The channel includes one or more notches to position and secure the at least one accessory module on the lower member.

A power connector arrangement is attachable to the lower member or rail adjacent the channel. The power connector arrangement includes at least one electrically conductive strip provided adjacent the channel for supplying electrical power from the vehicle to the at least one accessory module. The at least one accessory module comprises a module housing, at least one retainer clip extending from a top surface of the housing for selectively engaging the channel of the mounting arrangement and at least one electrical connector engaging the power connector arrangement to supply power or electrical signals to the at least one accessory module. A locking arrangement extends through a hole in the top surface of the housing between the opposing arms of the retainer clip to secure the at least one accessory module to the overhead console mounting arrangement.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 5 is a cross-sectional view of the upper rail of the modular overhead console assembly connected to the headliner of the vehicle;

FIG. 6 is a cross-sectional view of the lower rail of the modular overhead console assembly connected to the upper rail and headliner of the vehicle;

FIG. 7 is a cross-sectional view of the assembled upper and lower rails of the modular overhead console assembly having electrical connectors disposed therebetween;

FIG. 8 is a cross-sectional view of an accessory module connected to the lower rail of the modular overhead console assembly;

FIG. 9 is a cross-sectional view of a trim cap mounted to the modular overhead console assembly of the present invention;

FIG. 10 is a cross-sectional view of an alternative mounting arrangement for connecting the lower rail of the modular overhead console assembly to the upper rail and headliner of the vehicle; and FIG. 11 is a cross-sectional view of an alternative mounting arrangement for securing an accessory module connected to the modular overhead console assembly.

DETAILED DESCRIPTION OF THE PREFERRED EMBODIMENT(S)

Figure 1:
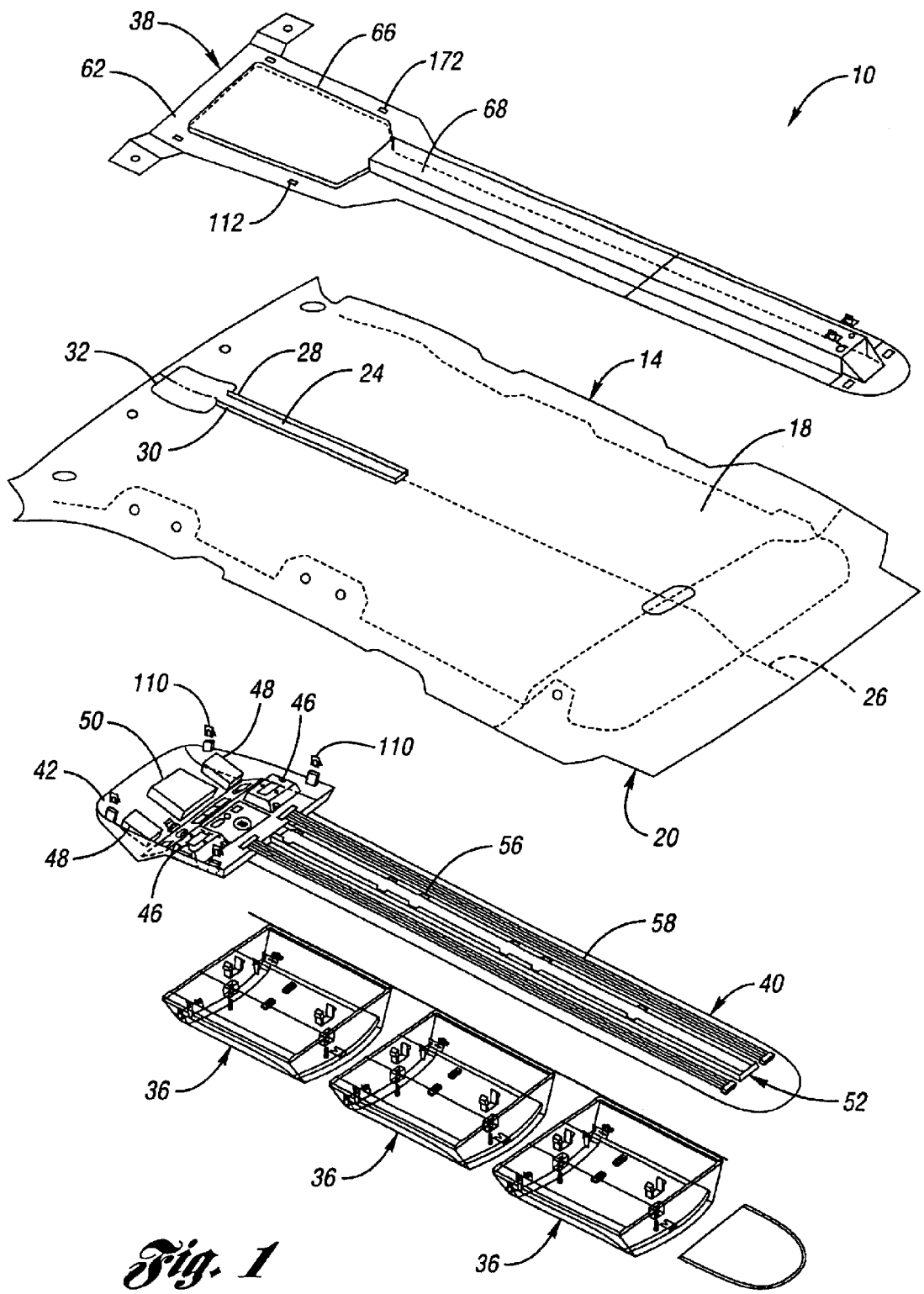
FIG. 1 is an exploded perspective view of a first of a modular overhead console assembly in accordance with the present invention.

Referring now to FIG. 1, a modular overhead console assembly 10 of the present invention is disclosed. Modular overhead console assembly 10 includes an overhead console mounting arrangement, generally referenced by numeral 12, secured to a headliner 14. Headliner 14 comprises an upper surface 18 attached to the frame of a vehicle roof (not shown) and a lower surface 20 facing the passenger compartment.

Headliner 14 is generally formed as a one-piece structure which extends above the interior passenger compartment of a vehicle. Headliner 14 may have any suitable configuration and comprise any suitable materials, such as any suitable natural materials and/or synthetic materials. Furthermore, the headliner body may include a single layer or multiple layer construction. The headliner body may also include a cover material or overlay (not shown), such as a polymeric material or fabric, that faces the interior passenger compartment of the vehicle.

An elongated slot 24 extends through the headliner 14 between the upper surface 18 and lower surface 20. Slot 24 generally extends along the longitudinal axis 26 of headliner 14 and forms a pair of opposing side surfaces 28, 30 in headliner 14. An opening 32 is formed adjacent the front edge of slot 24 to receive overhead vehicle components 34, such as lighting fixtures or electronic displays or other devices requiring electrical or electronic interface. It is understood that slot 24 may be formed in the headliner 14 at a variety of positions or orientations to accomplish a similar result.

Figure 2:
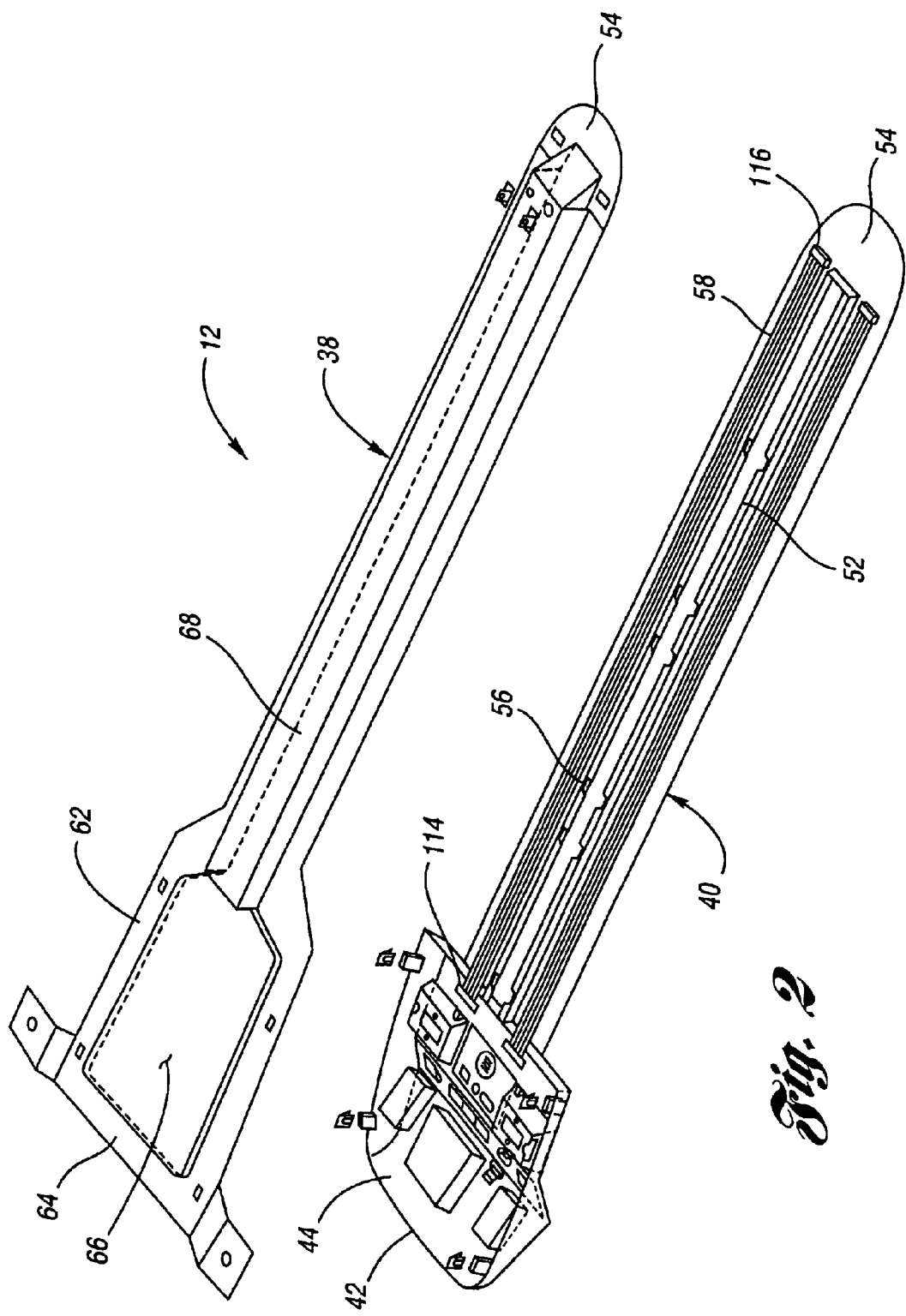
FIG. 2 is an exploded perspective view of the upper and lower rail arrangement of the modular overhead console assembly.

Referring additionally now to FIG. 2, overhead console mounting arrangement 12 comprises a two piece construction for receiving and mounting one or more removable accessory modules 36. Overhead console mounting arrangement 12 includes an upper rail or member 38 mounted to the upper surface 18 of the headliner 14 and a lower rail or member 40 mounted to the lower surface 20 of headliner 14. A console bezel 42 is disposed on a forward portion 44 of the lower rail 40 to receive a variety of electronic vehicle components 34.

For example, overhead reading lights 46, switches 48 for controlling sunroof and lighting functions and a universal garage door opener 50 may be mounted within the console bezel 42 to allow passengers to control a variety of vehicle and external functions. It is understood that a variety of components may also be installed in console bezel 42, including temperature sensors for the passenger compartment, voice recording systems and two-way vehicle communication devices that are well known in the art.

A channel 52 extends from the console bezel 42 to a rear portion 54 of the lower rail 40 adjacent the elongate slot 24 in headliner 14. One or more indexes or notches 56 are formed in channel 52 to position and removably secure one or more accessory modules 36 to the channel 52. At least one electrically conductive strip 58 extends along a bottom surface 60 of the lower rail 40 adjacent the channel 52 to provide a power connection for electronic devices disposed within accessory modules 36. A description of the lower rail electrical power arrangement will be discussed in greater detail below.

Upper member or rail 38 includes a console retainer 62 molded adjacent a forward portion 64 of the upper rail 38. An opening 66 in console retainer 62 corresponds to opening 32 in headliner 14 to receive vehicle electronics components 34 mounted in console bezel 42 of lower rail 40. An elongate cavity 68 extends from console retainer 62 toward a rear portion of the upper rail 38 adjacent slot 24 in headliner 14. Cavity 68 cooperates with channel 52 in lower rail 40 and slot 24 in headliner 14 to receive the retaining clips of the accessory modules 36.

Upper member or rail 38 and lower member or rail 40 of overhead console mounting arrangement 12 are preferably mountable to the headliner such that a portion of the upper rail 38 extends above the lower surface 20 of headliner 14 and the lower rail 40 extends below the lower surface 20 of headliner 14. Rails 38, 40 may be molded as single piece members mounted on opposing surfaces of the headliner 14. In another aspect of the invention, console bezel 42 may be formed separately from channel 52 of lower member or rail 40 and joined to headliner 14. Additionally, as is illustrated in FIG. 2, upper and lower rails 38, 40 may be formed and joined as multiple member sections as required by space requirements in the passenger compartment of the vehicle. For example, a single piece rail assembly may be required for the passenger compartment of a compact vehicle, while a multiple piece rail assembly may be necessary to support accessory modules in a sport utility vehicle passenger compartment.

Figure 3:
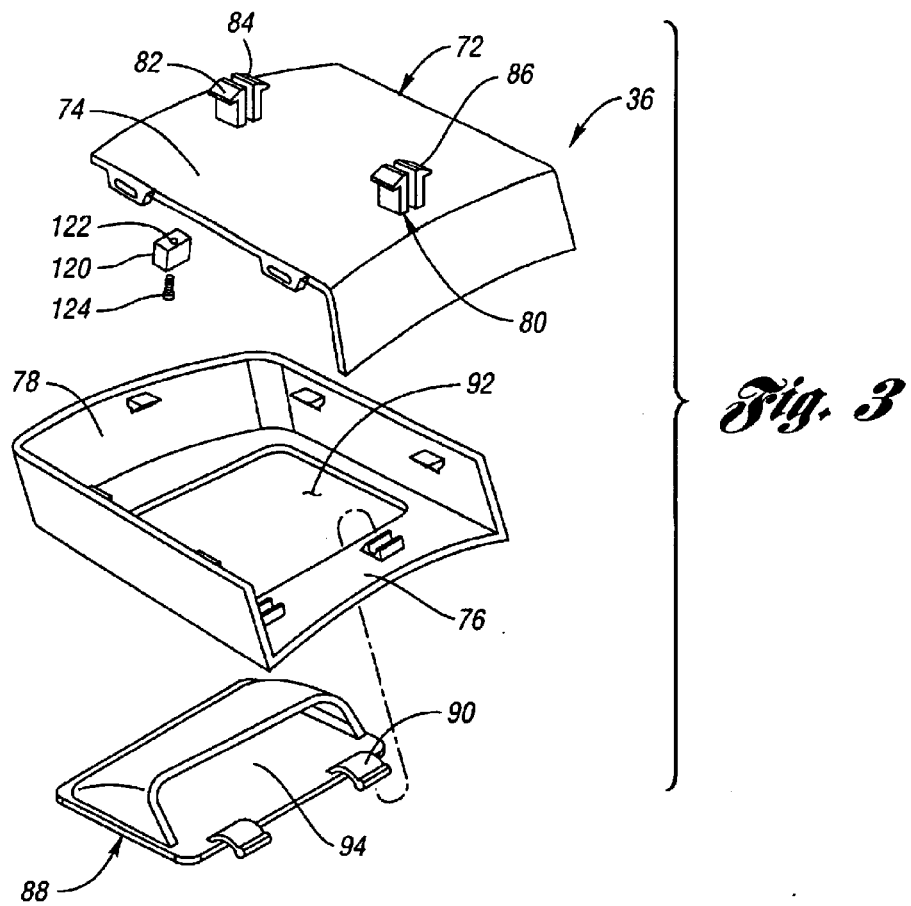
FIG. 3 is an exploded perspective view of a removable accessory module in accordance with the present invention.
Figure 4:
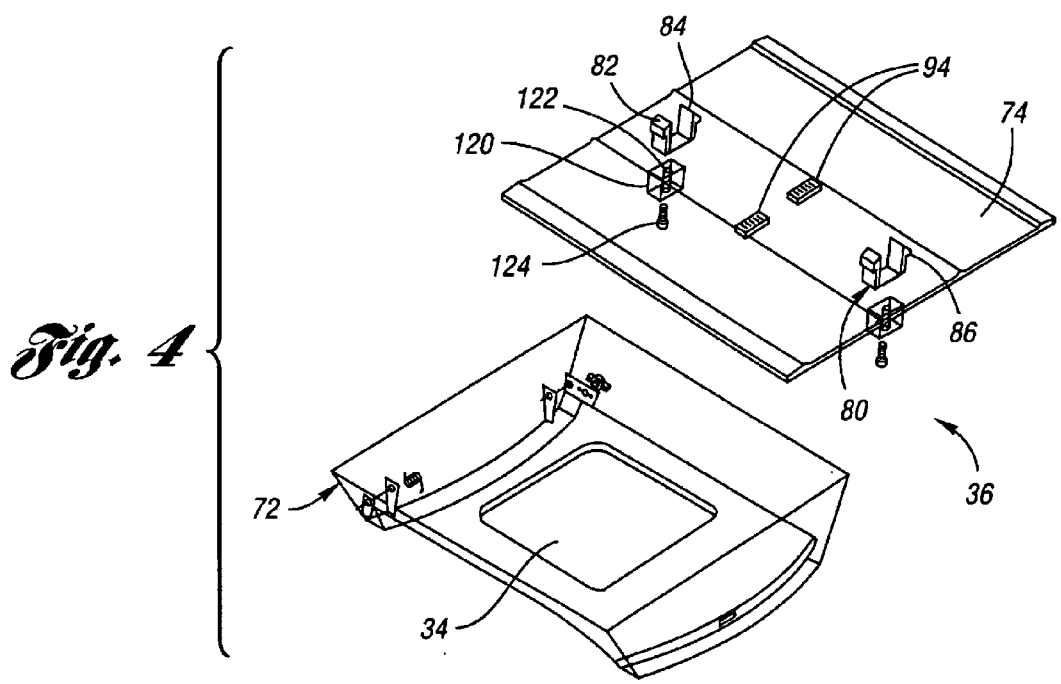
FIG. 4 is an exploded perspective view of a removable accessory module with electrical connectors adapted to cooperate with power or signal connections in the overhead console mounting arrangement.

Referring now to FIGS. 3 and 4, accessory modules 36 of modular overhead console assembly 10 are discussed in greater detail. In one aspect of the invention, accessory module 36 comprises a module housing 72 having an top surface 74, a bottom surface 76 and a storage area 78 defined therebetween. At least one retainer clip 80 having a pair of opposing arms 82, 84 extend upward from the top surface 74 of the housing 72. Each arm 82, 84 includes a projection 86 which engages a portion of channel 52 of lower rail 40 to secure the accessory module 36 to lower rail 40. In a preferred embodiment of the invention, a pair of retainer clips 80 are provided on the top surface 74 of module housing 72 to secure the module 36 to the lower rail 40.

Accessory modules 36 can be configured to store a variety of materials within storage area 78. As is shown in FIG. 3, module 36 is configured to hold a pair of sunglasses or the like. Door 88 pivotally mounts to the bottom surface 76 of module housing 72 by hinges 90. Door 88 extends between an open position generally perpendicular to the bottom surface 76 of housing 72 and a closed position wherein door 88 is received in aperture 92. A storage pocket 94 is formed on door 88 to retain sunglasses or the like. It is understood that the configuration of the bottom surface 74 of module housing 72 may be modified to store other materials within storage area 78, such as tissue boxes, compact discs or garage door openers.

Referring now to FIG. 4, accessory modules 36 may house electrical components 34 requiring power or signal to operate, such as DVD video player or global position system (GPS) units. One or more electrical connectors 94 are molded into or attached to the top surface 74 of the module housing 72. Connectors 94 are power contacts which, when placed in contact with electrically conductive strips or wires 58 on lower rail 40, provide power to the electrical components stored with module housing 72. This power arrangement will be discussed in greater detail below.

Referring now to FIGS. 5-8, a description of the method of assembling the modular overhead console assembly 10 in accordance with the present invention is discussed. As is shown in FIG. 5, upper member or rail 38 is mounted to the upper surface 18 of headliner 14 such that cavity 68 is aligned with the elongated slot 24 in headliner 14. Clips 96 disposed on the top surface 98 of upper rail 38 extend through apertures 100 in roof bow 102 to connect upper rail 38 and headliner 14 to the roof bow 102. Inserts 104, such as foam strips or the like, extend between the roof bow 102 and the upper surface 18 of headliner 14 to stabilize the position of the overhead console mounting arrangement 12.

FIG. 6 illustrates the assembly of the lower member or rail 40 to the headliner 14 and upper rail 38. Channel 52 of lower rail 40 is positioned adjacent the lower surface 20 of headliner 14 to align channel 52 with slot 24 and cavity 68 in upper rail 38. Upper and lower rails 38, 40 are secured together by screws or other fastener action (see FIG. 10) 106 inserted into corresponding apertures 108 in the upper rail 38.

In another aspect of the invention illustrated in FIG. 10, legs 103 extend upward from lower rail 40 through an apertures 105 in the upper rail 38 to secure the upper and lower rails 38, 40 together. Retaining ribs 107 on upper rail 38 cooperate with projections 109 of legs 103 to lock rails 38, 40 in position. Additionally, as is illustrated in FIG. 1, console bezel 42 includes clips 110 which are inserted into pockets 112 in console retainer 62 to attach the upper and lower rails 38, 40 together.

Referring now to FIGS. 2 and 7, a discussion of the electrical connector arrangement of the modular overhead console assembly 10 of the present invention is discussed in greater detail. Electric power or signals are supplied from a vehicle electrical system through electrically conductive strips or wires 58 extending along the bottom surface 60 of the lower rail 40 adjacent the channel 52 to accessory module 36. Electrically conductive strips or conductors 58 are formed from flat round wire, printed circuit (PC) board or flex cable and extend between a plug in connector 114 in the console bezel 42 and a molded connector 116 in the rear portion 54 of the lower rail 40.

Strips 58 are attached to the bottom surface 60 of the lower member or rail 40 by molded in snaps or tabs. Alternatively, pressure sensitive adhesive (PSA) may be used to secure the strips in position on lower rail 40. Electrical connectors 94 on the top surface 74 of module housing 72 engage conductive strips 58 to supply power or signals to the accessory module 36. Notches 56 in channel 52 cooperate with retainer clips 80 on module housing to secure the accessory module 36 on lower rail 40 and position connectors 94 adjacent conductive areas of strips 58 to ensure an optimum power connection.

FIGS. 4 and 8 illustrates the mounting arrangement for the one or more accessory modules 36 in the overhead console mounting arrangement 12. Retainer clips 80 extending upward from the top surface 74 of module housing 72 are inserted through the channel 52 of lower rail 40. Projections 86 on retainer clips 80 engage an extension surface 118 of the channel 52 of lower rail 40 to mount the accessory module 36 to the mounting arrangement 12. Notches 56 cooperate with retainer clips 80 to secure the accessory module 36 in place to reduce the potential of the module 36 falling off channel 52 during an emergency situation.

A locking mechanism inserted between opposing arms 82, 84 of retainer clip 80 to assist clip 80 in securing accessory module 36 to the overhead console mounting arrangement 12. Locking mechanism includes a lug 120 inserted through an opening in the top surface 74 of module housing 72 between the retainer clips 80, forcing opposing arms 82, 84 to engage channel 52 of lower rail 40. Lug 120 includes an aperture 122 which receives a screw 124.

A boss 126 in cavity 68 of upper rail 38 cooperates with screw 124 tightened through lug 120, to secure accessory module 36 in position in overhead console assembly 10. In another aspect of the invention illustrated in FIG. 11, a boss nut 134 snaps into a hole in the cavity 68 of upper rail 38 to cooperate with lug 120 receiving fastener 124 for mounting accessory module 36 to mounting arrangement 12.

Referring now to FIG. 9, a trim cap 128 is inserted over lower rail 40 to cover channel 52 and slot 24. Trim cap 128 includes a lower decorative surface 130 matching overlay 22 on headliner 14 covering an exposed portion of the lower rail 40 of mounting arrangement 12 until additional accessory modules 36 are added to the console assembly 10. In another aspect of the invention, trip cap 128 may include a retainer clip extending upward from a top surface which engages channel 52 of lower rail 40. Bosses 132 on the lower rail 40 provide retention for securing the rail 40 to the headliner 14 to complete assembly of the mounting arrangement 12 of overhead console assembly 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An overhead console assembly and headliner combination for use in a passenger compartment of a vehicle, the combination comprising:

a headliner having an upper surface, a lower surface and an elongated slot formed therethrough;

an overhead console mounting arrangement securable to the headliner, the mounting arrangement having an upper member mountable to the upper surface of the headliner such that a portion of the upper member extends above the lower surface of the headliner and a lower member attachable to the upper member such that the lower member extends below the lower surface of the headliner, wherein the lower member includes a channel extending adjacent to the elongated slot in the headliner;

a power or signal connector arrangement mounted to the lower member adjacent the channel; and at least one accessory module selectively positionable and removably attachable to the channel of the lower member, the at least one accessory module including a housing and at least one retainer clip extending from a top surface of the housing to engage the channel of the mounting arrangement.

2. The combination of claim 1 further comprising a plurality of notches formed in the channel of the lower member to position and secure the at least one accessory module to the lower member.

3. The combination of claim 1 wherein the power or signal connector arrangement further comprises at least one electrically conductive strip in communication with a vehicle electrical system secured to a bottom surface of the lower member adjacent the channel for supplying power or electrical signals to the at least one accessory module.

4. The combination of claim 3 wherein the power connector arrangement further comprises a pair of electrically conductive wires secured to the bottom surface of the lower member adjacent each side of the channel.

5. The combination of claim 3 wherein the at least one electrically conductive strip is formed of flat wire.

6. The combination of claim 3 wherein the at least one electrically conductive strip is formed of printed circuit (PC) material.

7. The combination of claim 3 wherein the at least one electrically conductive strip is formed of a flexible cable or circuit.

8. The combination of claim 1 wherein the at least one accessory module comprises a housing, a storage area defined within the housing and at least one retaining clip extending from a top surface of the housing to removably secure the at least one accessory module to the channel of the overhead console mounting arrangement.

9. The combination of claim 8 wherein the at least one accessory module further comprises at least one electrical connector disposed on the top surface of the module housing, wherein the at least one electrical connector engages the at least one electrically conductive strip on the lower member to supply power or an electrical signal to a component mounted in the housing of the at least one module.

10. The combination of claim 1 wherein a pair of opposing retainer clips extend upward from the top surface of the housing adapted to engage the channel of the lower member of the overhead console mounting arrangement.

11. The combination of claim 1 wherein a locking mechanism extends through a hole in the top surface of the housing between the opposing arms of the at least one retainer clip to secure the at least one accessory module to the overhead console mounting arrangement.

12. The combination of claim 1 wherein the at least one accessory module comprises a plurality of accessory modules mounted adjacent one another on the channel of the overhead console mounting arrangement.

13. The combination of claim 1 further comprising a trim cap having a lower decorative surface and an upper surface releasably secured to the channel of the lower member.

14. The combination of claim 1 wherein the upper member further comprises a raised cavity cooperating with the elongate slot and the channel in the lower member to receive and secure the at least one accessory module.

15. A modular overhead console assembly for use with a vehicle having a headliner, the headliner having an upper surface, a lower surface and an elongated slot formed therethrough, the assembly comprising:

an upper member mountable to the headliner adjacent the elongated slot such that the upper member extends above the lower surface of the headliner;

a lower member attachable to the upper member such that the lower member extends below the lower surface of the headliner, the lower member including a channel extending adjacent to the elongated slot;

at least one electrically conductive strip provided on the lower member adjacent the channel, wherein the at least one conductive strip configured to communicate with a vehicle electrical system; and at least one accessory module selectively positionable on and removably attachable to the channel of the lower member, the at least one accessory module including a housing, at least one retainer clip extending from a top surface of the housing to selectively engage the channel and at least one electrical connector engageable with the at least one electrically conductive strip for receiving power or electrical signals from the at least one electrically conductive strip.

16. The assembly of claim 15 wherein the at least one accessory module comprises a plurality of accessory modules mounted adjacent one another on the channel of the lower member.

17. The assembly of claim 15 wherein one or more notches are formed on the channel of the lower member to position and secure the at least one accessory module to the lower member.

18. The assembly of claim 15 wherein the at least one electrically conductive strip comprises a pair of electrically conductive wires secured to the bottom surface of the lower member adjacent each side of the channel.

19. The assembly of claim 15 wherein the at least one accessory module further comprises a pair of opposed retainer clips extending upward from the top surface of the housing adapted to engage the channel of the lower member and a locking pin extending through a hole in the top surface of the housing between the opposing arms of each retainer clip to secure the at least one accessory module to the channel.

20. The assembly of claim 16 wherein the upper member further comprises a raised cavity cooperating with the elongate slot and the channel in the lower member to receive and secure the at least one accessory module.

* * * * *